(12) United States Patent
Takamatsu (10) Patent No.: US 9,282,556 B2
(45) Date of Patent: Mar. 8, 2016

(54) BASE STATION AND COMMUNICATION METHOD THEREOF

(75) Inventor: Nobuaki Takamatsu, Yokohama (JP)

(73) Assignee: KYOCERA CORPORATION, Fushimi (JP)

( * ) Notice: Subject to any disclaimer, the term of this patent is extended or adjusted under 35 U.S.C. 154(b) by 423 days.

(21) Appl. No.: 13/027,514

(22) Filed: Feb. 15, 2011

(65) Prior Publication Data

US 2012/0207125 A1 Aug. 16, 2012

(51) Int. Cl.
| | |
|---|---|
| H04W 72/04 | (2009.01) |
| H04W 72/12 | (2009.01) |
| H04W 72/02 | (2009.01) |
| H04W 48/12 | (2009.01) |
| H04W 88/08 | (2009.01) |

(52) U.S. Cl.
CPC ........ *H04W 72/044* (2013.01); *H04W 72/0446* (2013.01); *H04W 72/0453* (2013.01); *H04W 88/08* (2013.01)

(58) Field of Classification Search
USPC ......... 370/330, 241, 252, 329, 328, 280, 312, 370/322
See application file for complete search history.

(56) References Cited

U.S. PATENT DOCUMENTS

| | | | |
|---|---|---|---|
| 7,423,586 B2 | 9/2008 | Schieblich | |
| 7,885,673 B2 * | 2/2011 | Brunel et al. | 455/506 |
| 8,040,854 B2 | 10/2011 | Furueda et al. | |
| 8,179,783 B2 | 5/2012 | Cheng et al. | |
| 8,908,657 B2 * | 12/2014 | Oizumi | H04W 72/0446 370/336 |
| 9,119,196 B2 * | 8/2015 | Nishio | H04L 5/0007 |
| 2008/0225802 A1 | 9/2008 | Sun et al. | |
| 2008/0227449 A1 * | 9/2008 | Gholmieh et al. | 455/434 |
| 2008/0259892 A1 | 10/2008 | Li et al. | |
| 2008/0279124 A1 * | 11/2008 | Furueda et al. | 370/280 |
| 2009/0046800 A1 | 2/2009 | Xu et al. | |

(Continued)

FOREIGN PATENT DOCUMENTS

| | | |
|---|---|---|
| CN | 101179313 A | 5/2008 |
| CN | 101257340 A | 9/2008 |

(Continued)

OTHER PUBLICATIONS

"Physical Channels and Modulation;" 3GPP TS 36.211 (V8.7.0); May 2009.

(Continued)

*Primary Examiner* — Wutchung Chu
(74) *Attorney, Agent, or Firm* — Oliff PLC (57) ABSTRACT

Provided is a base station for communicating with a mobile station by assigning at least a part of a communication frame including a plurality of wireless communication channels in a frequency direction. The communication frame includes at least one special subframe having a data transmission region available for transmission to the mobile station and a data reception region available for reception from the mobile station, separated from the data transmission region in a time direction. The base station includes an assignment unit 50 for assigning, in the special subframe, the data transmission region for transmission of downlink control information to nearby mobile stations and the data reception region for reception of uplink control information from the nearby mobile stations, and a transmission and reception unit 10 for transmitting the downlink control information in the data transmission region and for receiving the uplink control information in the data reception region.

9 Claims, 8 Drawing Sheets

(56) References Cited

U.S. PATENT DOCUMENTS

| | | |
|---|---|---|
| 2009/0073902 A1 | 3/2009 | Astely et al. |
| 2009/0088148 A1* | 4/2009 | Chung et al. ................. 455/423 |
| 2010/0027700 A1 | 2/2010 | Sahara |
| 2010/0195586 A1* | 8/2010 | Choi ................. H04W 72/042 370/329 |
| 2010/0232546 A1* | 9/2010 | Yu ..................... H04W 72/042 375/300 |
| 2010/0260036 A1 | 10/2010 | Molnar et al. |
| 2011/0075624 A1* | 3/2011 | Papasakellariou et al. ... 370/329 |
| 2011/0170496 A1* | 7/2011 | Fong et al. .................... 370/329 |
| 2011/0195719 A1 | 8/2011 | Chmiel et al. |
| 2011/0235555 A1* | 9/2011 | Zhang et al. .................. 370/280 |
| 2012/0106372 A1* | 5/2012 | Gaal et al. ..................... 370/252 |
| 2012/0176884 A1* | 7/2012 | Zhang .................... H04B 7/024 370/203 |
| 2012/0188877 A1* | 7/2012 | Chin et al. .................... 370/241 |
| 2013/0058240 A1* | 3/2013 | Kim ..................... H04L 5/0007 370/252 |
| 2013/0142111 A1* | 6/2013 | Kim .................... H04W 76/046 370/315 |
| 2013/0329711 A1* | 12/2013 | Seo ..................... H04J 11/0069 370/336 |
| 2014/0219212 A1* | 8/2014 | Seo ........................ H04B 7/155 370/329 |

FOREIGN PATENT DOCUMENTS

| | | |
|---|---|---|
| CN | 101409929 A | 4/2009 |
| JP | A-2006-333143 | 12/2006 |
| JP | A-2008-160569 | 7/2008 |
| JP | A-2008-182668 | 8/2008 |
| JP | A-2009-503958 | 1/2009 |

OTHER PUBLICATIONS

Jul. 9 Office Action issued in Japanese Patent Application No. 2010-025894.

Aug. 20, 2013 Office Action issued in Japanese Patent Application No. 2011-547331 (with concise explanation of the relevance).

Chinese Office Action dated May 6, 2014 from Chinese Patent Application No. 201080059218.4 (with English-language concise statement of relevance).

Japanese Office Action dated May 7, 2014 from Japanese Patent Application No. 2010-025894 (with English-language concise statement of relevance).

Japanese Office Action issued in Japanese Patent Application No. 2010-025894 dated Jan. 7, 2014 (w/ partial translation).

CWTS, "Cell Search procedures for low chip rate TDD option," Mar. 3, 2009, pp. 1-2, TSGR1#11(00)0290.

Mar. 4, 2013 Office Action issued in U.S. Appl. No. 13/519,560.

Chinese Office Action issued in Chinese Patent Application No. 201110043056.1 dated Feb. 17, 2014 (w/ partial translation).

\* cited by examiner

Prior Art

FIG. 5

▨ DL Region
☐ Guard Time
▨ UL Region
■ Reference Signal

Prior Art

FIG. 6

| Special Subframe Configuration | DL Region [OFDM Symbol] | UL Region [OFDM Symbol] | Guard Time [OFDM Symbol] |
|---|---|---|---|
| 0 | 3 | 1 | 10 |
| 1 | 9 | 1 | 4 |
| 2 | 10 | 1 | 3 |
| 3 | 11 | 1 | 2 |
| 4 | 12 | 1 | 1 |
| 5 | 3 | 2 | 9 |
| 6 | 9 | 2 | 3 |
| 7 | 10 | 2 | 2 |
| 8 | 11 | 2 | 1 |

Prior Art

BASE STATION AND COMMUNICATION METHOD THEREOF

TECHNICAL FIELD

The present invention relates to base stations and communication methods of base stations.

BACKGROUND ART

A standards body of mobile communication methods, 3GPP, has recently been deliberating about LTE (Long Term Evolution). In the LTE, a frequency band of a system is divided into a plurality of resource blocks (RB), each of which includes one or more (for example, 12) subcarriers. In the LTE, assignment of resource block to a mobile station is performed in every subframe of 1 ms.

Figure 4:
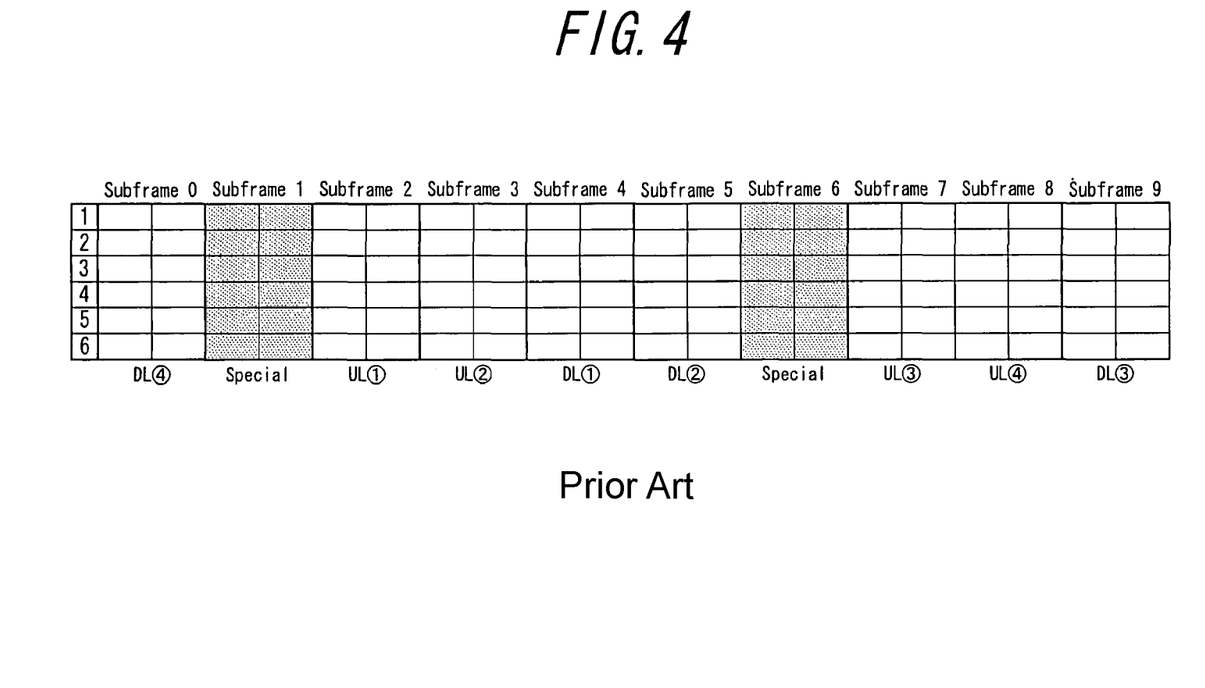
FIG. 4 is a diagram illustrating an exemplary configuration of a communication frame of LTE.
Figure 5:
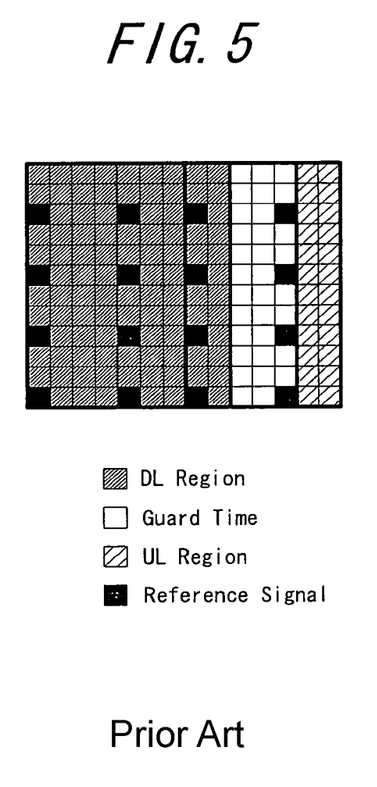
FIG. 5 is a diagram illustrating an exemplary symbol arrangement of a special subframe.
Figure 6:
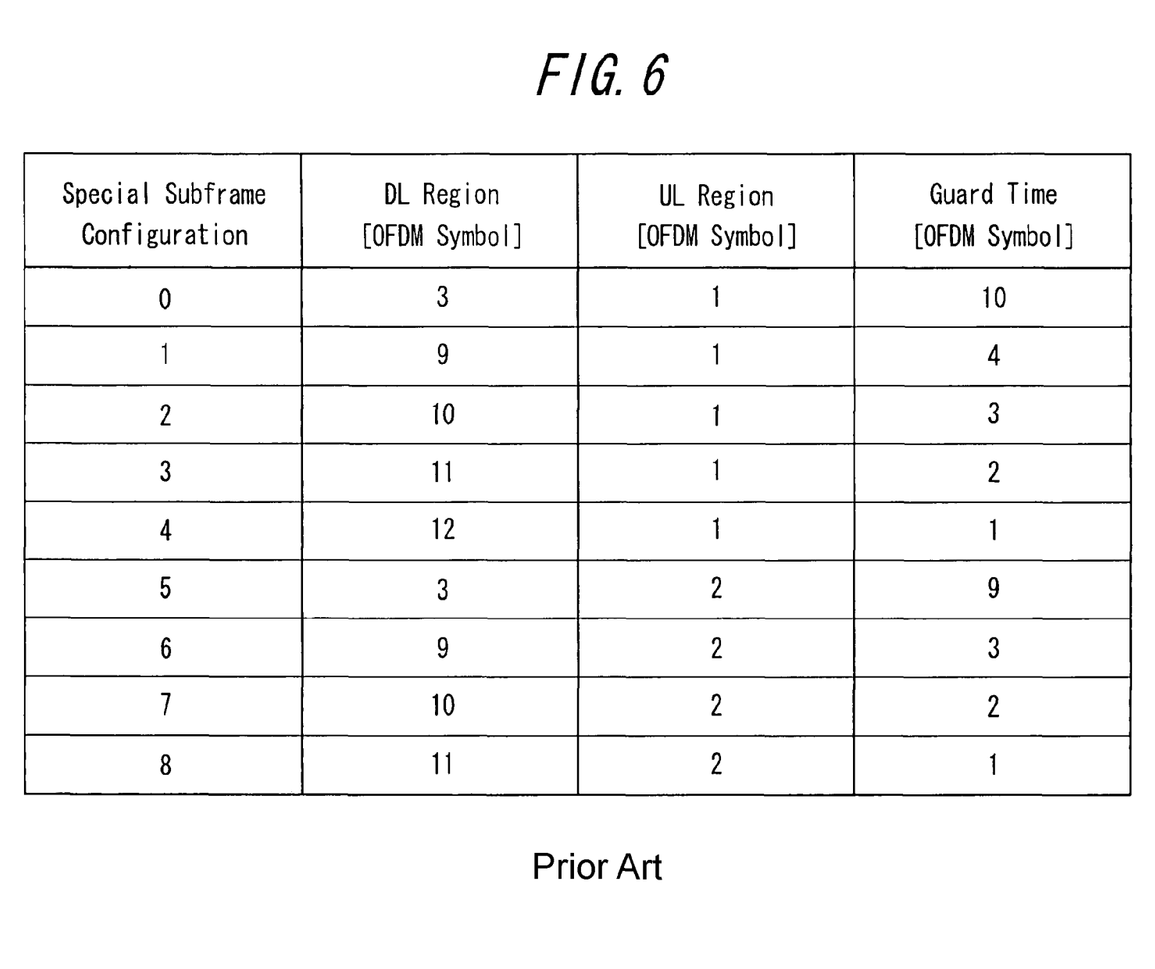
FIG. 6 is a diagram illustrating an exemplary configuration of the special subframe.

As shown in FIG. 4, a communication frame of LTE applicable to TDD consists of 10 subframes. The subframes are categorized into UL subframe available for uplink communication from the mobile station to the base station, DL subframe available for downlink communication from the base station to the mobile station, and special subframe having both a UL region (data reception region) available for the uplink communication and a DL region (data transmission region) available for the downlink communication. FIG. 5 is a diagram illustrating an exemplary symbol arrangement in the special subframe. As shown in FIG. 5, the top 9 symbols in the special subframe are the DL region for the downlink communication and the last 2 symbols across 3 symbols of a guard time are the UL region for the uplink communication. Various configurations of the special subframe, not limited to the symbol arrangement of the FIG. 5, are defined as shown in a table in FIG. 6.

Communications between the base station and a mobile station are performed using the subframes of 3 types described above. For example, physical channels such as PDCCH (Physical Downlink Control Channel), PDSCH (Physical Downlink Shared Channel) and the like are mapped on the DL subframes for the downlink communication. Among them, the PDSCH is used for transmission of user data separately transmitted to each mobile station and control information such as paging information and SIB (System Information Block) transmitted simultaneously to nearby mobile stations. In contrast, the UL subframe for the uplink communication is used for transmission of user data from each mobile station to the base station and control information such as random access from the nearby mobile stations to the base station on the physical channels such as PRACH (Physical Random Access Channel) and the like (for example, see 3GPP TS 36.211 (V8.7.0), "Physical Channels and Modulation", May 2009).

SUMMARY OF INVENTION

Technical Problem

The conventional LTE assigns resources without a distinction between communications related to the control information between the base station and nearby mobile stations and communications related to the user data between the base station and each of the mobile stations. That is, the conventional LTE appropriately assigns, for the control information of the downlink and that of the uplink, a DL subframe and a UL subframe arbitrarily selected.

Such a resource assignment by the LIE causes a problem in introduction of AAS (Adaptive Antenna System). The AAS performs adaptive control on weight of each of a plurality of antenna elements constituent of an array antenna in accordance with a propagation environment, in order to change the directivity of radio waves. An adaptive array base station corresponding to the AAS appropriately controls beam forming, null steering and the like to a desired mobile station, by using antenna weights calculated based on a reference signal transmitted from the mobile station, in downlink transmission.

It is preferred that the AAS sets a pair of UL subframe and DL subframe and uses the pair for communication between the base station and the mobile station. This is based on that, if receiving the reference signal transmitted in the UL subframe from the mobile station, the base station can calculate an optimum transmission weight from the reference signal and perform the downlink communication in the DL subframe more efficiently.

Figure 7:
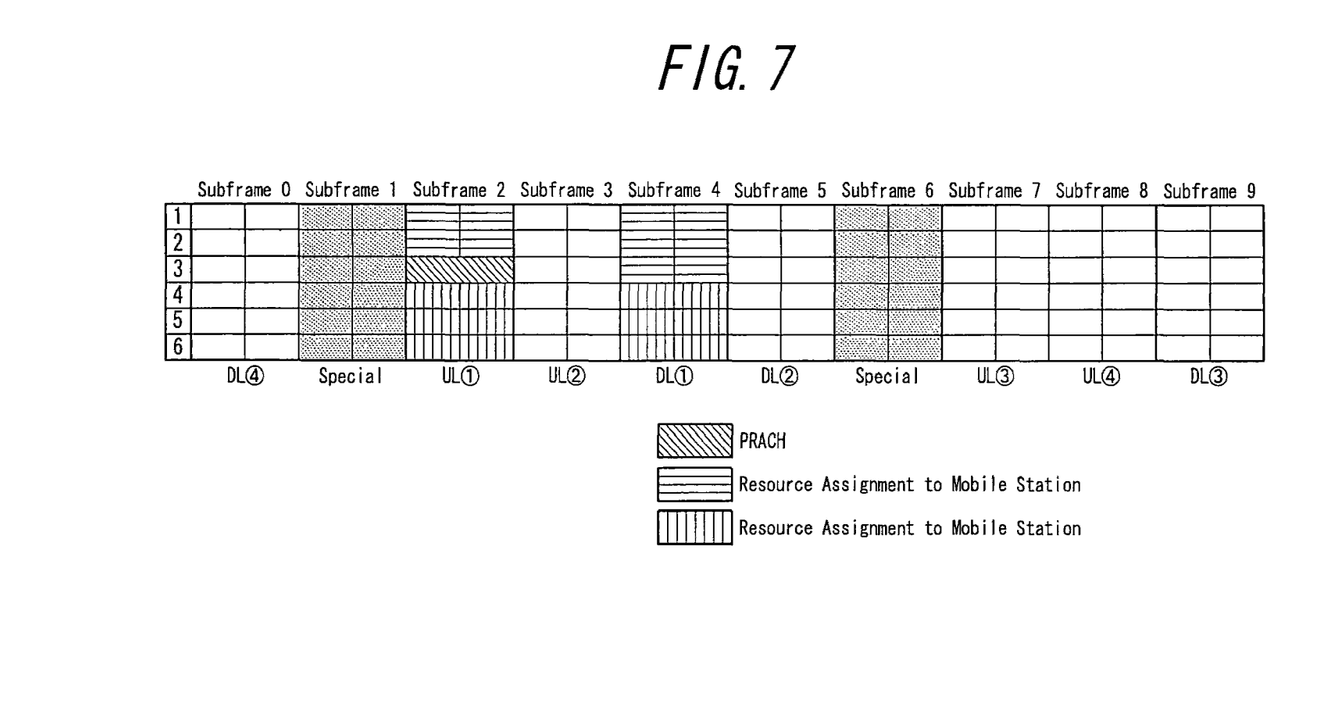
FIG. 7 is a diagram illustrating an exemplary resource assignment of a conventional LTE.

FIG. 7 is a diagram illustrating an exemplary resource assignment by the conventional LTE. As shown in FIG. 7, a subframe 2 as the UL subframe and a subframe 4 as the DL subframe are paired with each other. Here, although resource blocks 1-3 in the subframe 4 are assigned to a mobile station A, only resource blocks 1-2 in the subframe 2 are assigned to the mobile station A. In this case, since nearby mobile stations perform random access to the base station in the resource block 3 of the subframe 2, the base station cannot calculate an optimum transmission weight for the mobile station A in the resource block 3 of the subframe 4. Therefore, a transmission efficiency of the AAS is deteriorated.

Figure 8:
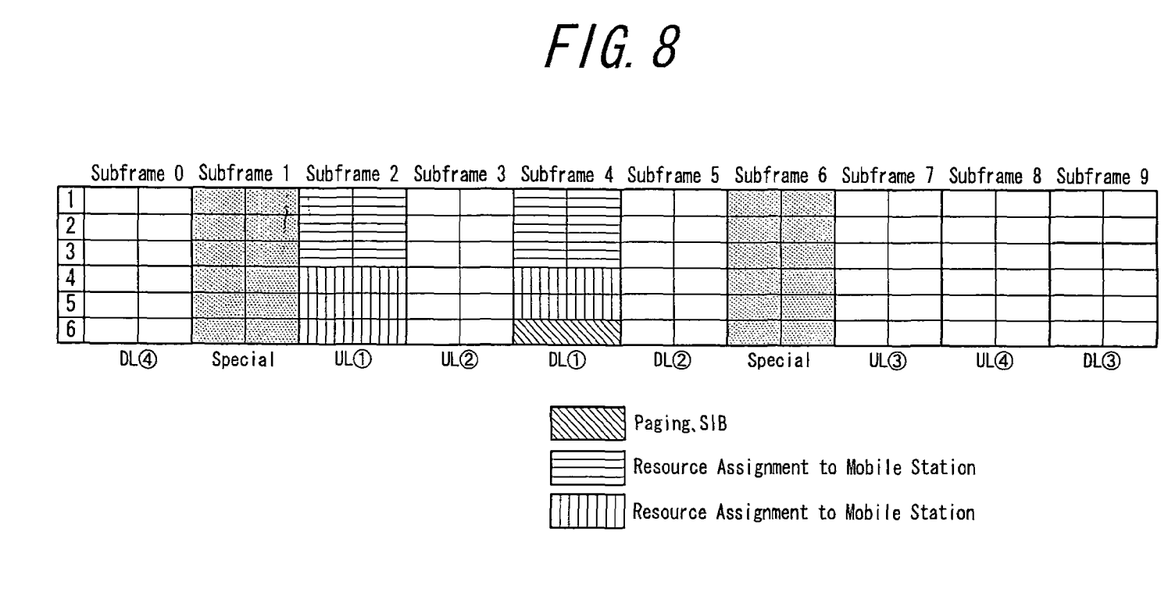
FIG. 8 is a diagram illustrating another exemplary resource assignment of the conventional LTE.

Similarly, FIG. 8 is a diagram illustrating an exemplary resource assignment by the conventional LTE. As shown in FIG. 8, the subframe 2 as the UL subframe and the subframe 4 as the DL subframe are paired with each other. Here, although resource blocks 4-6 in the subframe 2 are assigned to a mobile station B, only resource blocks 4-5 in the subframe 4 are assigned to the mobile station B. In this case, since the base station transmits Paging and the SIB to the nearby mobile stations in the resource block 6 of the subframe 4, a transmission weight based on the reference signal transmitted in the resource block 6 of the subframe 2 from the mobile station is not used. Therefore, the transmission efficiency of the AAS is deteriorated.

There is therefore a need in the art for a base station and a communication method of a base station capable of assigning resources without deteriorating the transmission efficiency of the AAS.

Solution to Problem

In order to solve the above problems, a base station according to a first aspect of the present invention is a base station communicating with a mobile station by assigning at least a part of a communication frame including a plurality of wireless communication channels in a frequency direction to the mobile station, the communication frame including at least one special subframe having a data transmission region available for transmission to the mobile station and a data reception region available for reception from the mobile station, separated from the data transmission region in a time direction, the base station includes:

an assignment unit for assigning, in the special subframe, the data transmission region for transmission of downlink control information to a nearby mobile station and assigning the data reception region for reception of uplink control information from the nearby mobile station; and a transmission and reception unit for transmitting the downlink control information in the data transmission region and for receiving the uplink control information in the data reception region.

A second aspect of the present invention is the base station according to the first aspect, wherein, if the communication frame includes a plurality of special subframes, the assignment unit assigns each data transmission region of the plurality of special subframes for transmission of same downlink control information.

A third aspect of the present invention is the base station according to the first or second aspect, wherein the communication frame further includes an uplink subframe available for uplink communication from the mobile station and a downlink subframe, paired with the uplink subframe, available for downlink communication to the mobile station, the base station further includes a calculation unit for calculating a transmission weight for the downlink subframe based on a signal received in the uplink subframe, the assignment unit assigns the uplink subframe and the downlink subframe for communication with each mobile station related to user data, and the transmission and reception unit transmits the user data to the mobile station by adaptive array control based on the transmission weight.

Although apparatuses are used as solutions according to the present invention as described above, it is to be understood that the present invention can also be implemented as methods, programs, and storage media storing the programs and hence they are included within a scope of the present invention.

For example, as a method implementing the present invention, a communication method of a base station, according to a fourth aspect of the present invention, is a method for communicating with a mobile station by assigning at least a part of a communication frame including a plurality of wireless communication channels in a frequency direction to the mobile station, the communication frame including at least one special subframe having a data transmission region available for transmission to the mobile station and a data reception region available for reception from the mobile station, separated from the data transmission region in a time direction, and includes the steps of:

assigning, in the special subframe, the data transmission region for transmission of downlink control information to a nearby mobile station and assigning the data reception region for reception of uplink control information from the nearby mobile station; and transmitting the downlink control information in the data transmission region and receiving the uplink control information in the data reception region.

A fifth aspect of the present invention is the communication method of the base station according to the fourth aspect, wherein, if the communication frame includes a plurality of special subframes, at the step of assigning, each data transmission region of the plurality of special subframes is assigned for transmission of the same downlink control information.

A sixth aspect of the present invention is the communication method of the base station according to the fourth or fifth aspect, wherein the communication frame further includes an uplink subframe available for uplink communication from the mobile station and a downlink subframe, paired with the uplink subframe, available for downlink communication to the mobile station, and the communication method further includes calculating a transmission weight for the downlink subframe based on a signal received in the uplink subframe, wherein at the step of assigning, the uplink subframe and the downlink subframe are assigned for communication with each mobile station related to user data, and at the step of transmitting, the user data is transmitted to the mobile station by adaptive array control based on the transmission weight.

According to the present invention, it is possible to assign resources without deteriorating a transmission efficiency of AAS by assigning a special subframe for communication related to the control information between a base station and nearby mobile stations.

BRIEF DESCRIPTION OF DRAWINGS

Preferred embodiments of the present invention will now be described with reference to the accompanying drawings in which.

DESCRIPTION OF EMBODIMENTS

Figure 1:
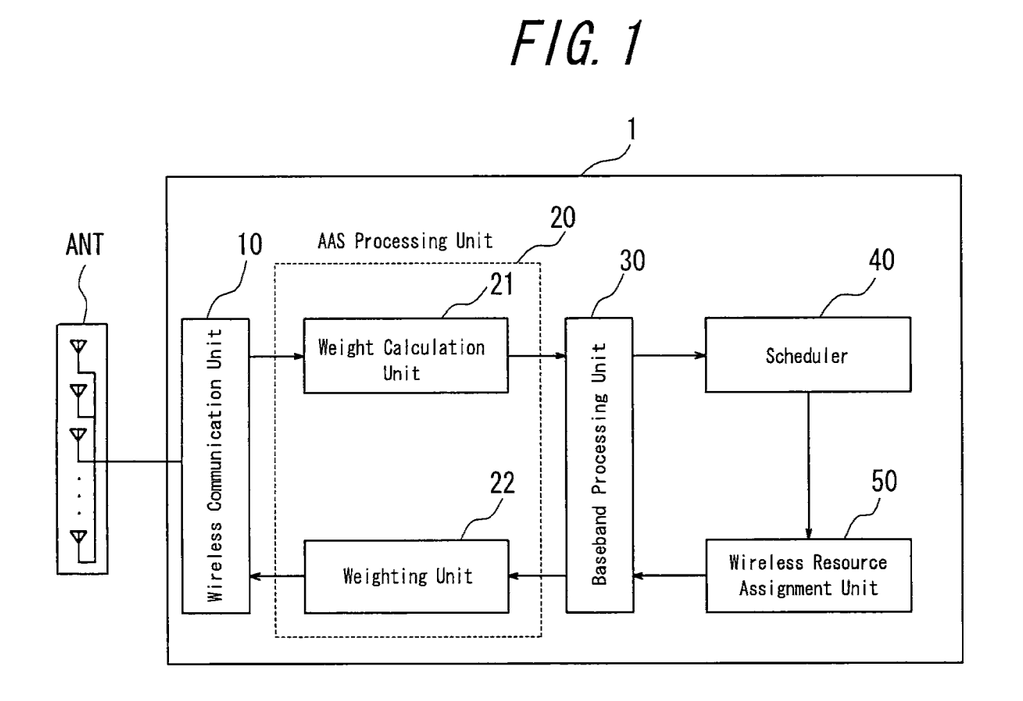
FIG. 1 is a functional block diagram illustrating a base station according to one embodiment of the present invention.

FIG. 1 is a diagram illustrating a schematic configuration of an adaptive array base station 1 according to one embodiment of the present invention. The adaptive array base station 1 includes an array antenna ANT, a wireless communication unit (transmission and reception unit) 10, an AAS processing unit 20 including a weight calculation unit 21 and a weighting unit 22, a baseband processing unit 30, a scheduler 40 and a wireless resource assignment unit (assignment unit) 50. The wireless communication unit 10, the AAS processing unit 20 and the baseband processing unit 30 may use interface equipment/circuits suitable for LTE, whereas the scheduler 40 and the wireless resource assignment unit 50 may be implemented with suitable processors such as a CPU or the like. The following is a detailed description of each of the units.

The wireless communication unit 10, in processing of a reception system, converts a wireless signal with a carrier frequency received by the array antenna ANT into a baseband signal, and outputs the baseband signal to the weight calculation unit 21. In addition, the wireless communication unit 10, in processing of a transmission system, converts a baseband signal from the weighting unit 22 into a signal with a carrier frequency and transmits it to a mobile station via the array antenna ANT by adaptive array control.

In the AAS processing unit 20, the weight calculation unit 21 for the reception system performs adaptive signal processing on the signal input from the wireless communication unit 10 and outputs the processed signal to the baseband processing unit 30. In the adaptive signal processing, in particular, the weight calculation unit 21, by using a reference signal transmitted in a UL subframe from the mobile station and other known information, calculates a transmission weight (phase/ amplitude weight of each antenna element) for a DL subframe paired with the UL subframe from phase information obtained for each antenna element of the array antenna ANT and the like, in order to obtain a high transmission gain to the mobile station. On the other hand, the weighting unit 22 for the transmission system weights the signal input from the baseband processing unit 30 with the transmission weight obtained by the weight calculation unit 21, and outputs the weighted signal to the wireless communication unit 10.

The baseband processing unit 30, in processing of the reception system, demodulates the signal input from the weight calculation unit 21 and outputs results of demodulation to the scheduler 40 separately for each mobile station. In addition, the baseband processing unit 30, in processing of the transmission system, outputs a symbol stream of data to be transmitted to a mobile station, which is input from the wireless resource assignment unit 50, to the weighting unit 22.

The scheduler 40 determine a mobile station to assign resource blocks, based on received data from each mobile station input from the baseband processing unit 30. Specifically, the scheduler 40 determines the mobile station to assign the resource blocks, according to a received signal quality of each resource block informed from the mobile station, channel quality information (CQI) or an amount of data to be transmitted.

The wireless resource assignment unit 50 assigns wireless resources to the mobile station determined by the scheduler 40. As stated above, the subframes of LTE applicable to TDD are categorized into UL subframe available for uplink communication from a mobile station to the base station, DL subframe available for downlink communication from the base station to the mobile station, and special subframe including both a UL region (data reception region) available for the uplink communication and a DL region (data transmission region) available for the downlink communication. Here, the wireless resource assignment unit 50 assigns the special subframe for the communication related to control information between the base station and nearby mobile stations, such as Paging/SIB of the downlink and PRACH of the uplink. In addition, the wireless resource assignment unit 50 assigns the UL subframe and the DL subframe, paired with each other, for the communication with an individual mobile station related to user data. When assigning a pair of the UL subframe and the DL subframe to a plurality of mobile stations, the wireless resource assignment unit 50 assigns resources such that communication with each mobile station is performed on the same frequency band (resource block) of the UL subframe and the DL subframe.

Figure 2:
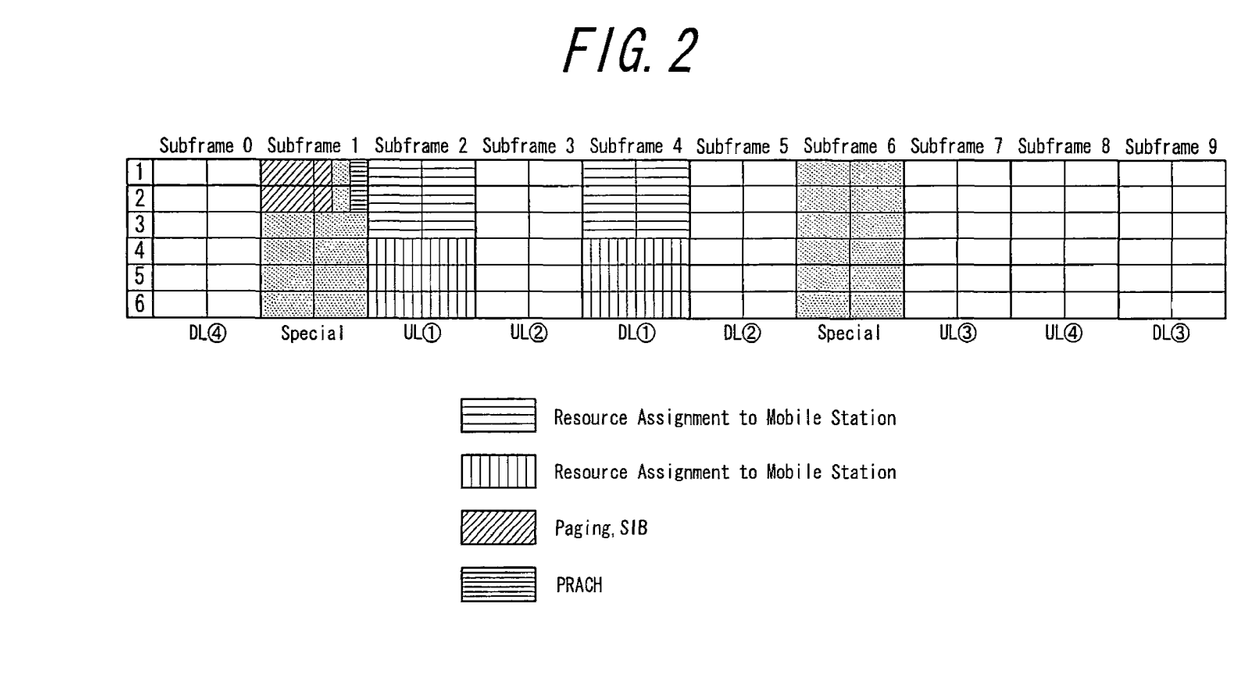
FIG. 2 is a diagram illustrating an exemplary resource assignment according to the embodiment of the present invention.

FIG. 2 is a diagram illustrating an exemplary resource block assignment by the wireless resource assignment unit 50. As shown in FIG. 2, the DL region of the subframe 1, which is the special subframe, is allocated to the Paging/SIB, and a part of the UL region is allocated to PRACH. In addition, in the pair of the UL subframe (subframe 2) and the DL subframe (subframe 4), resource blocks 1-3 are assigned for the communication to the mobile station A, and the resource blocks 4-6 are assigned for the communication to the mobile station B. Thereby, upon reception of reference signals in the subframe 2 as the UL subframe transmitted from the mobile station A and the mobile station B, the base station can calculate an optimum transmission weight to the subframe 4 as the DL subframe from the reference signals. Additionally, since the communication related to the control information between the base station and nearby mobile stations can be performed in the special subframe, such communication does not deteriorate AAS communication efficiency.

The wireless resource assignment unit 50 performs symbol mapping (assignment of amplitude and phase) in accordance with a modulation scheme on the transmission data including the control information to the mobile station and the user data and outputs a generated symbol stream to the baseband processing unit 30.

Figure 3:
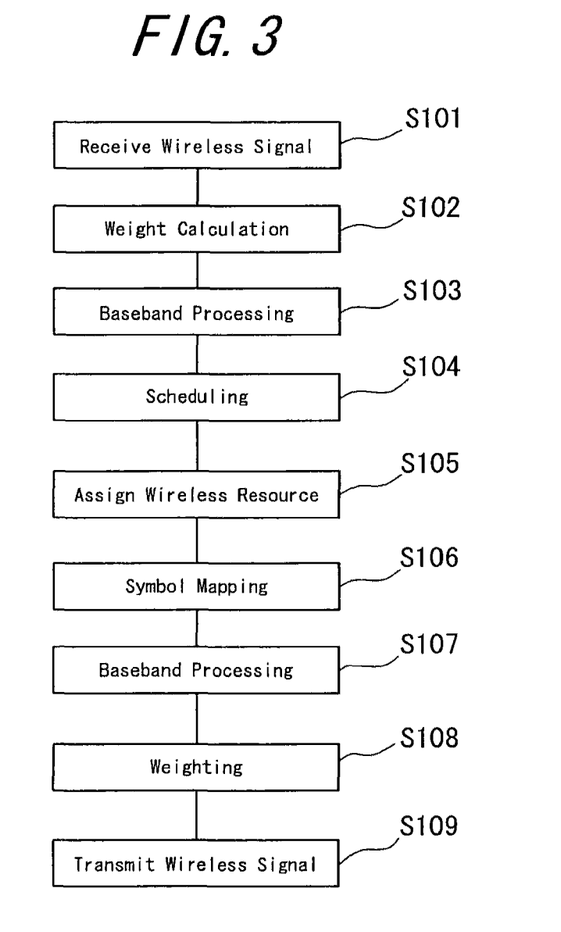
FIG. 3 is a flowchart illustrating operation of the base station shown in FIG. 1.

FIG. 3 is a flowchart illustrating operation of the base station 1 shown in FIG. 1. Upon reception of wireless signals from a mobile station via the array antenna ANT, the wireless communication unit 10 converts received wireless signals with the carrier frequency into baseband signals, and outputs the baseband signals to the weight calculation unit 21 (step S101). By using the reference signal transmitted from the mobile station and other known information, the weight calculation unit 21 calculates a transmission weight which enables to obtain a high transmission gain to the mobile station, from phase information of each antenna array of the array antenna ANT and the like (step S102). Specifically, the weight calculation unit 21, based on the reference signal and the like transmitted in the UL subframe from the mobile station, calculates the transmission weight to a DL subframe paired with the UL subframe such that the high transmission gain to the mobile station can be obtained. The baseband processing unit 30 demodulates the signals input from the weight calculation unit 21 and outputs demodulation results to the scheduler 40 separately for each mobile station (step S103).

The scheduler 40 determines a mobile station to assign resource blocks based on received data from each mobile station input from the baseband processing unit 30 (step S104). The wireless resource assignment unit 50 assigns the wireless resources to the mobile station determined by the scheduler 40 (step S105). Here, the wireless resource assignment unit 50 assigns a special subframe for the communication related to the control information between the base station and the nearby mobile stations. In addition, the wireless resource assignment unit 50 assigns, for the communication with the individual mobile station related to the user data, the UL subframe and the DL subframe paired with each other.

The wireless resource assignment unit 50 performs symbol mapping, in accordance with the modulation scheme, on the transmission data including the control information to the mobile station and the user data and outputs the generated symbol stream to the baseband processing unit 30 (step S106). The baseband processing unit 30 outputs the symbol stream of the transmission data to the mobile station input from the wireless resource assignment unit 50 to the weighting unit 22 (step S107). The weighting unit 22 weights the signal input from the baseband processing unit 30 with the transmission weight obtained by the weight calculation unit 21, and outputs the weighted signal to the wireless communication unit 10 (step S108). The wireless communication unit 10 converts the baseband signal from the weighting unit 22 into a signal with a carrier frequency and transmits the signal to the mobile station via the antenna array ANT by the adaptive array control (step S109).

According to the present embodiment, the wireless resource assignment unit 50 assigns the special subframe for the communication related to the control information between the base station and nearby mobile stations. Accordingly, it prevents the Paging/SIB of the downlink and the PRACH of the uplink from interfering with the user data to the individual mobile station, and thereby enables resource assignment without deteriorating AAS transmission efficiency. In addition, since the special frame is assigned for transmission and reception of the control information, the mobile station near the base station needs only to receive the special subframe at predetermined intervals in Paging, for example. Thereby, it is possible to reduce power consumption of the mobile station.

In addition, the wireless resource assignment unit 50 assigns a pair of the UL subframe and the DL subframe for the communication with the individual mobile station related to the user data. It thus enables communication with the individual mobile station using an optimum transmission weight, which enhances the AAS transmission efficiency. Moreover, when assigning a pair of the UL subframe and the DL subframe to a plurality of mobile stations, the wireless resource assignment unit 50 assigns the resources such that the communication with each mobile station is performed on the same frequency band (resource block) of the UL subframe and the DL subframe. Thereby, it is possible to enhance the AAS transmission efficiency to the plurality of mobile stations as well.

Although the present invention is described based on the figures and the embodiment, it is appreciated that those skilled in the art may easily vary or modify in a multiple manner based on disclosure of the present invention. Accordingly, such variation and modification are included in a scope of the present invention. For example, a function or the like of each component or each step can be rearranged avoiding a logical inconsistency, such that a plurality of components or steps are combined or divided.

For example, if there are a plurality of special subframes in one communication frame, the wireless resource assignment unit 50 may transmit the same downlink control information, such as the Paging/SIB, in each DL region of the plurality of special subframes. Thereby, the base station can transmit the control information to the nearby mobile stations more definitely.

The invention claimed is:

1. A base station for communicating with a mobile station using TDD communication by assigning at least a part of a communication frame including a plurality of wireless communication channels in a frequency direction to the mobile station, the communication frame including at least one special subframe having a data transmission region available for transmission to the mobile station and a data reception region available for reception from the mobile station, separated from the data transmission region in a time direction, the base station comprising:

an assignment unit for assigning, in the special subframe, the data transmission region for transmission of downlink control information to a nearby mobile station and assigning the data reception region for reception of uplink control information from the nearby mobile station; and a transmission and reception unit for transmitting the downlink control information in the data transmission region and for receiving the uplink control information in the data reception region, wherein the assignment unit assigns control information transmitted by the physical downlink shared channel "PDSCH" simultaneously to nearby mobile stations to the data transmission region as the downlink control information and when assigning a pair of an uplink subframe and a downlink subframe to a plurality of mobile stations, the assignment in the special subframe includes an assignment performed on a same frequency band of the uplink subframe and the downlink subframe, and wherein the assignment unit performs the assignment using one resource block of a plurality of resource blocks assigned as the special subframe, wherein the one resource block for the special subframe is a different resource block than resource blocks of the plurality of resource blocks assigned for TDD communication to the mobile stations.

2. The base station according to claim 1, wherein if the communication frame includes a plurality of special subframes, the assignment unit assigns each data transmission region of the plurality of special subframes for transmission of same downlink control information.

3. The base station according to claim 1, wherein the communication frame further includes the uplink subframe available for uplink communication from the mobile station and the downlink subframe, paired with the uplink subframe, available for downlink communication, to the mobile station, and the base station further comprises a calculation unit for calculating a transmission weight for the downlink subframe based on a signal received in the uplink subframe, wherein the assignment unit assigns the uplink subframe and the downlink subframe for communication with each mobile station related to user data, and the transmission and reception unit transmits the user data to the mobile station by adaptive array control based on the transmission weight.

4. The base station according to claim 2, wherein the communication frame further includes the uplink subframe available for uplink communication from the mobile station and the downlink subframe, paired with the uplink subframe, available for downlink communication to the mobile station, and the base station further comprises a calculation unit for calculating a transmission weight for the downlink subframe based on a signal received in the uplink subframe, wherein the assignment unit assigns the uplink subframe and the downlink subframe for communication with each mobile station related to user data, and the transmission and reception unit transmits the user data to the mobile station by adaptive array control based on the transmission weight.

5. A communication method of a base station for communicating with a mobile station using TDD communication by assigning at least a part of a communication frame including a plurality of wireless communication channels in a frequency direction to the mobile station, the communication frame including at least one special subframe having a data transmission region available for transmission to the mobile station and a data reception region available for reception from the mobile station, separated from the data transmission region in a time direction, the method comprising the steps of:

assigning, in the special subframe, the data transmission region for transmission of downlink control information to a nearby mobile station and assigning the data reception region for reception of uplink control information from the nearby mobile station; and transmitting the downlink control information in the data transmission region and receiving the uplink control information in the data reception region, wherein control information transmitted by the physical downlink shared channel "PDSCH" simultaneously to nearby mobile stations is assigned to the data transmission region as the downlink control information and when assigning a pair of an uplink subframe and a downlink subframe to a plurality of mobile stations, the assignment in the special subframe includes an assignment performed on a same frequency band of the uplink subframe and the downlink subframe, and wherein the assignment is performed using one resource block of a plurality of resource blocks assigned as the special subframe, wherein the one resource block for the special subframe is a different resource block than resource blocks of the plurality of resource blocks assigned for TDD communication to the mobile stations.

6. The communication method according to claim 5, wherein if the communication frame includes a plurality of special subframes, at the step of assigning, each data transmission region of the plurality of special subframes is assigned for transmission of the same downlink control information.

7. The communication method according to claim 5, wherein the communication frame further includes an uplink subframe available for uplink communication from the mobile station and a downlink subframe, paired with the uplink subframe, available for downlink communication to the mobile station, and the communication method further comprises calculating a transmission weight for the downlink subframe based on a signal received in the uplink subframe, wherein at the step of assigning, the uplink subframe and the downlink subframe are assigned for communication with each mobile station related to user data, and at the step of transmitting, the user data is transmitted to the mobile station by adaptive array control based on the transmission weight.

8. The communication method according to claim 6, wherein the communication frame further includes an uplink subframe available for uplink communication from the mobile station and a downlink subframe, paired with the uplink subframe, available for downlink communication to the mobile station, and the communication method further comprises calculating a transmission weight for the downlink subframe based on a signal received in the uplink subframe, wherein at the step of assigning, the uplink subframe and the downlink subframe are assigned for communication with each mobile station related to user data, and at the step of transmitting, the user data is transmitted to the mobile station by adaptive array control based on the transmission weight.

9. The base station according to claim 1, wherein the downlink control information is paging information and system information.

* * * * *